Nov. 10, 1942.  M. LEUPOLD  2,301,219
BRAKING SYSTEM FOR AUTOMOTIVE VEHICLES
Filed April 12, 1941  3 Sheets-Sheet 1
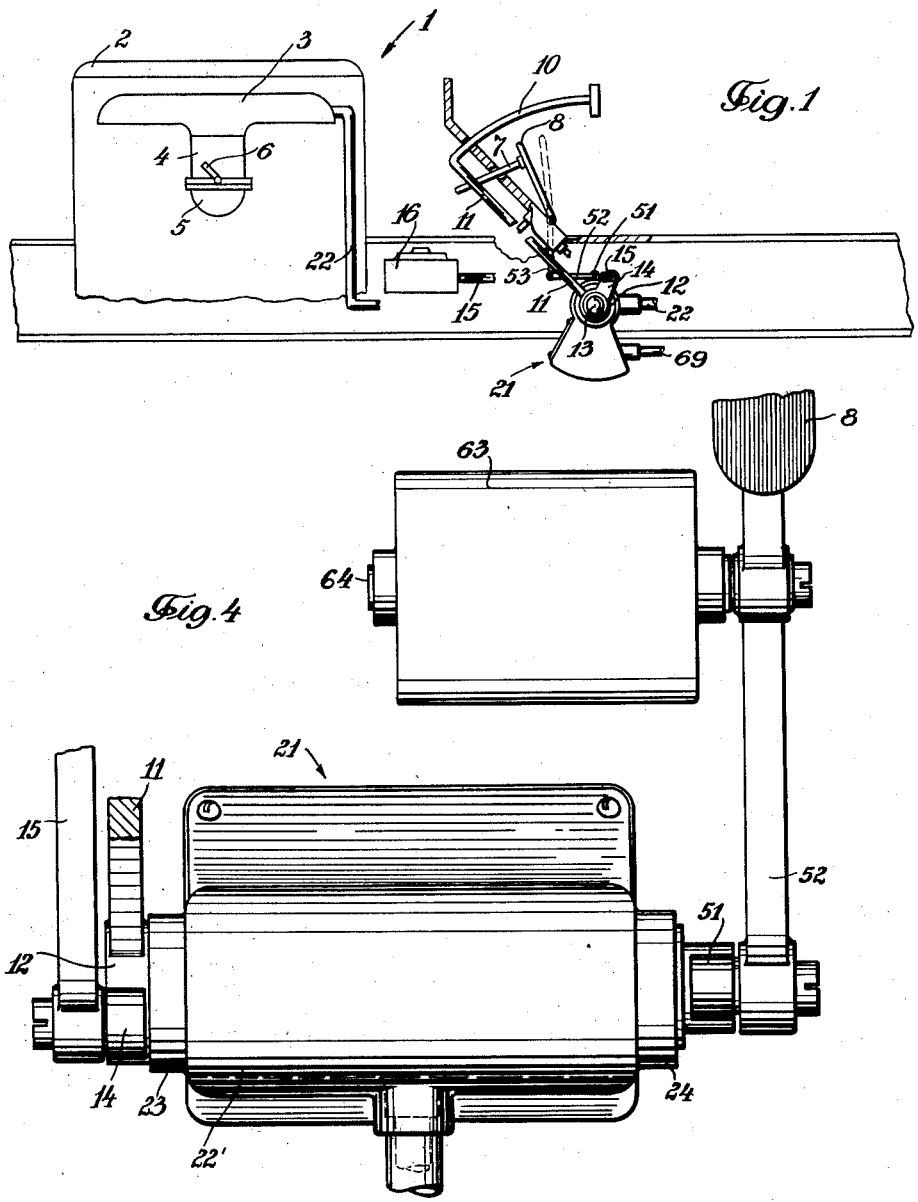
INVENTOR:
Mathias Leupold
BY Louis Burgess
ATTORNEY Nov. 10, 1942. M. LEUPOLD 2,301,219
BRAKING SYSTEM FOR AUTOMOTIVE VEHICLES
Filed April 12, 1941 3 Sheets-Sheet 2
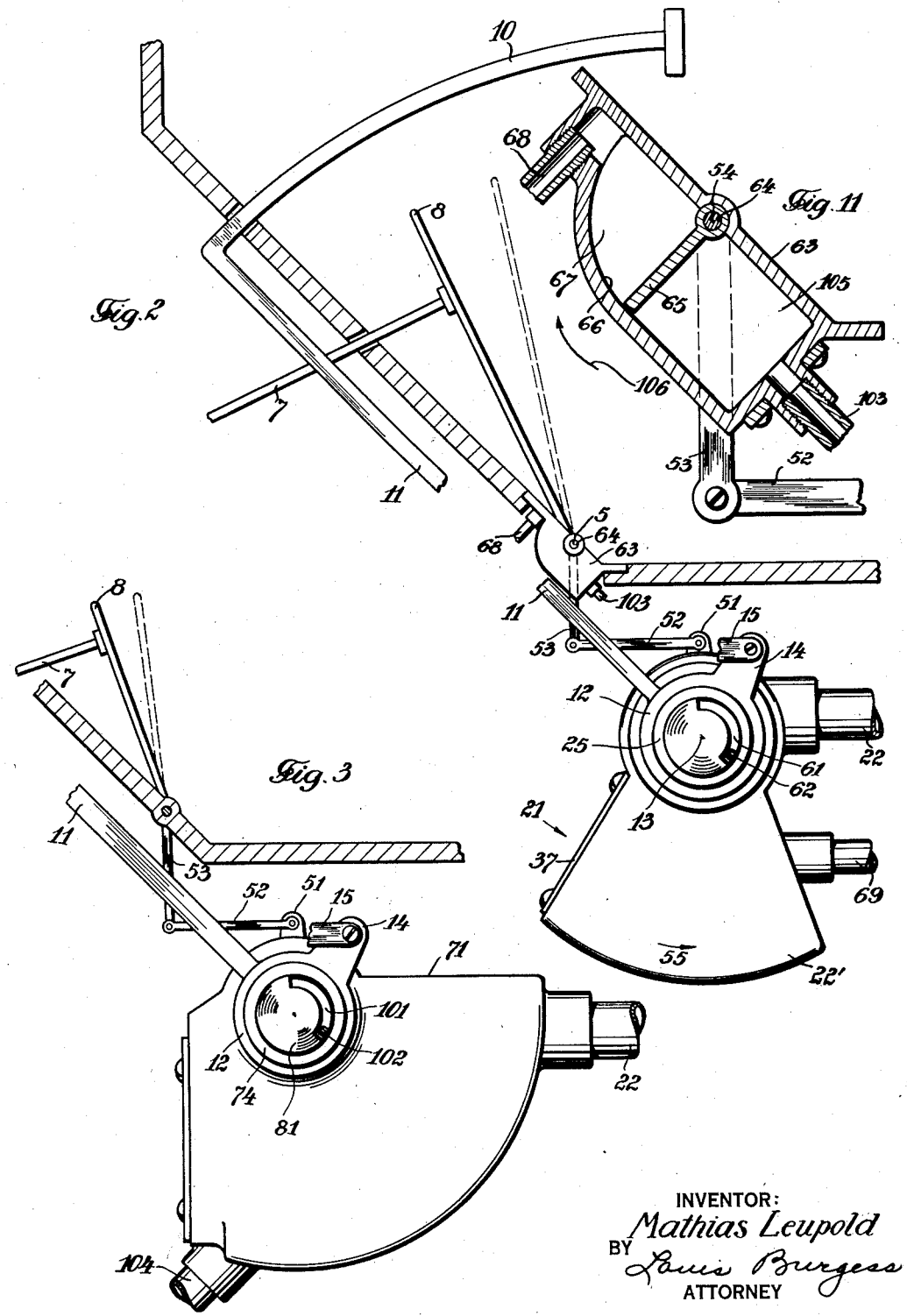
INVENTOR:
Mathias Leupold
BY Louis Burgess
ATTORNEY

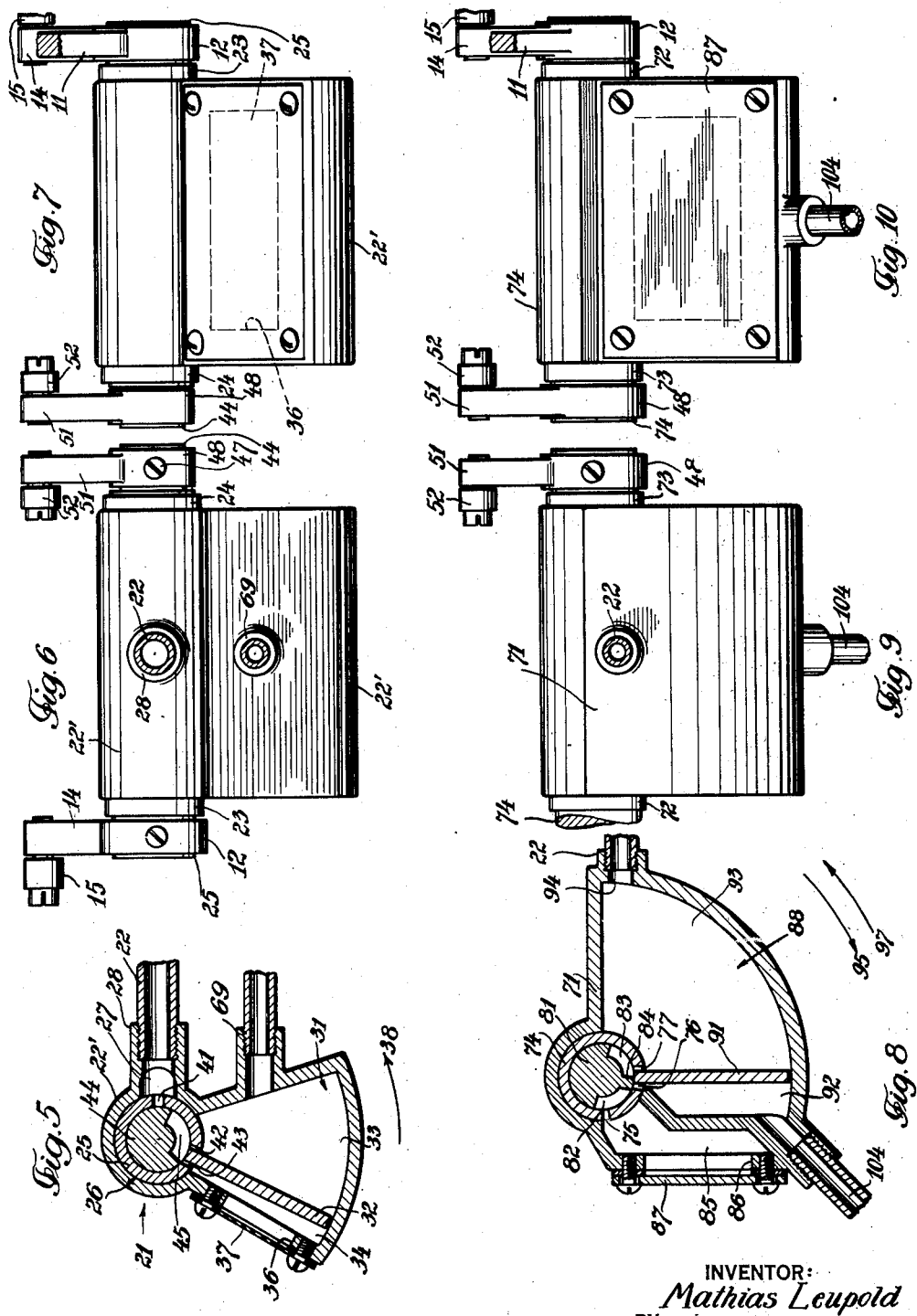

Patented Nov. 10, 1942

2,301,219

UNITED STATES PATENT OFFICE 2,301,219

BRAKING SYSTEM FOR AUTOMATIC VEHICLES

Mathias Leupold, Jamaica, N. Y.

Application April 12, 1941, Serial No. 388,218

9 Claims. (Cl. 192—3)

This invention is a new and useful improvement in braking systems for automotive vehicles.

An object of this invention is to provide a self-contained brake-pedal-power unit of a shape and construction which is simple and cheap to construct, effective in its operation and easy to install at or in the place where usually brake pedals are attached on an automotive vehicle.

Another object of this invention is to provide a combination of accelerator-decelerator treadle with a self-contained brake-pedal-power unit such that when said treadle is at approximately idling position a pressure differential is set up between the two sides of the brake-pedal-power piston and led to the operating side of the treadle-operating piston with tendency to press the treadle against the operator's foot, or, if the operator's foot has been taken off the treadle, to apply the brakes automatically.

Other uses and advantages will be apparent from the following description.

The invention will be fully understood from the following description read in conjunction with the drawings, in which—

Fig. 1 is a longitudinal vertical section through one embodiment of my invention;

Fig. 2 is a detailed showing of part of Fig. 1;

Fig. 3 is a corresponding view showing, however, alternative elements;

Fig. 4 is a top view of part of the construction shown in Fig. 2;

Fig. 5 is a central vertical section through an element of the construction shown in Figs. 1 and 2;

Fig. 6 is a rear view of the construction shown in Fig. 5;

Fig. 7 is a front view of the construction shown in Fig. 5;

Fig. 8 is a central vertical section through an element of the construction shown in Fig. 3;

Fig. 9 is a rear view of the construction shown in Fig. 8;

Fig. 10 is a front view of the construction shown in Fig. 8, and

Fig. 11 is a vertical section through an element of the construction shown in Fig. 2.

Referring to Fig. 1, I designates an automotive vehicle of the type driven by internal combustion engine 2 equipped with intake manifold 3 communicating through duct 4 with carburetor 5. Insofar as my specific invention is concerned, the intake manifold is a convenient source of vacuum and any other means of producing vacuum, such as a vacuum pump, may be equivalently employed. Flow of mixture from the carburetor through the duct is controlled by the usual butterfly valve operated by arm 6. Arm 6 is controlled through intermediate connections not shown by push rod 7 which bears against and is actuated by treadle 8. In its movement downwardly from the position shown in solid outline in Fig. 1 this treadle operates as an accelerator to determine the amount of combustible mixture fed to the engine from the carburetor. It is, however, adapted for movement upwardly beyond the position shown in solid outline in Fig. 1 to the position shown in dotted outline in Fig. 1 and within this range operates through the mechanism hereinafter described to controllably apply the brakes of the car.

In automobiles as at present constructed, in order to initiate braking, it is necessary for the operator to remove his foot from the accelerator pedal to the brake pedal and while the time required for this operation is not relatively long, it may, under various conditions, be critical, especially at higher driving speeds. I am aware that efforts have heretofore been made to solve this problem by so constructing the accelerator pedal and ancillary equipment that the brake is automatically applied by the further upward movement of the accelerator pedal. Such systems, however, present the difficulty that there is no precise control over the extent of the braking action or at most a relatively inexact control. In the apparatus which I have invented and which is hereinafter described, however, the desired advantages are retained while the specific disadvantages are eliminated and the extent of the braking action is subject to the precise and exact control of the operator by the extent to which he permits the treadle to rise. Moreover, in one embodiment of my invention the operator can feel the exact extent to which the braking system is applied since the force urging the treadle upwardly is, within the braking range, exactly proportional to the degree of braking action.

The automobile is equipped with a suitable braking system which in the specific embodiment illustrated is of the hydraulic type and for this purpose the automobile is provided with foot pedal 10 connected to lever 11 integral with ring 12. The lever and connected ring move pivotally about the axis 13. The ring also carries the projecting lever 14 operatively connected to push rod 15 by which the master cylinder 16 of the hydraulic braking system is applied.

The actual application of the braking system is effected by the element 21, the internal construction of which will be hereinafter described.

This element is operatively connected through tube 22 to the vacuum obtaining in manifold 3 while the operation of the element is controlled by the relative position of treadle 8.

Referring to Fig. 5, the element 21 includes the housing 22'. The housing 22' defines bearings 23 and 24 (Fig. 4 and Fig. 6) and the sleeve 25 is journaled in these bearings. Between the bearings the housing 22' defines longitudinal space 26 (Fig. 5) of tubular form within which the sleeve 25 turns. The housing 22' also defines a longitudinal port 27 communicating with the threaded neck 28 which receives tube 22. Housing 22' also defines chamber 31 of arcuate section. Sleeve 25 carries a projecting vane piston 32 which fits snugly the arcuate section of chamber 31 and in cooperation therewith defines two chambers 33 and 34 of variable size. Chamber 34 is provided with a port or window 36 overlain by air strainer 37 so that it is always at atmospheric pressure. Chamber 33 may be placed either in equilibrium with atmospheric pressure or with the vacuum obtaining in the manifold and whenever it is placed in equilibrium with vacuum, there will be a differential pressure exerted on the vane piston 32 turning the sleeve 25 in the direction indicated by arrow 38 (Fig. 5). By reference to Fig. 2 it will be seen that the sleeve 25 is secured to the ring 12. The sleeve and ring are suitably locked together so that when the sleeve turns the projecting lever 14 (Fig. 1) formed integral with the ring 12 operating through push rod 15 actuates master cylinder 16 and thereby applies the braking system. Sleeve 25 (Fig. 5) defines longitudinal slots 41, 42 and 43. These extend the length of the sleeve up to but not into the area overlain by bearings 23 and 24, the sleeve being unslotted within these areas. Journaled in the sleeve 25 is the stud 44 defining longitudinal channel 45. This channel extends up to but not into the areas overlain by bearings 23 and 24. The housing sleeve and stud therefore constitute a valve which is in reality a three-way valve since it controls communication between chambers 34 and 33 and between chambers 33 and tube 22. The stud 44 (Fig. 6) is secured by set screw 47 to ring 48 integral with lever 51. This is pivotally connected to push rod 52 which is in turn connected to arm 53 (Fig. 2) constituting the lower extension of treadle 8. Treadle 8 is adapted to move pivotally with respect to axis 54. As is evident from the construction shown in Fig. 2, as the treadle moves upwardly from the position shown in solid outline to the position shown in dotted outline, the stud 44 moves in the direction indicated by arrow 55.

In Fig. 5 the parts are shown in neutral position in which chamber 33 is in equilibrium with chamber 34, which in turn is at atmospheric pressure. In this position communication between chambers 33 and 34 is maintained through slot 42, channel 45 and slot 43. If, however, the treadle is permitted to rise from the position shown in solid outline, the stud 44 moves in the direction indicated by arrow 38, whereupon slot 43 is overlain by the solid portion of stud 44 and communication of chamber 33 with the atmosphere is blocked. Simultaneously slot 41 communicating with tube 22 is uncovered, whereupon vacuum is applied to chamber 33 with the result that the vane piston 32 is acted upon by the resulting pressure differential and arm 14 (Fig. 2) is turned with the consequent application of the master cylinder 16 of the hydraulic braking system. If, however, the treadle is held at any point, the stud 44 is immobilized and as soon as vane piston 32 has forced sleeve 25 to follow the stud to the position in which slots 41 and 43 are exactly overlain by the solid position of stud 44, thus cutting off chamber 33 from either air or vacuum, further application of the braking system is arrested. Preferably, the stud 44 (Fig. 2) is provided with a slight end channel 61, while the sleeve 25 carries a small inward projection 62. The form of the slot 61 and projection 62 is such that it does not interfere with the downward movement of treadle 8 but does prevent the treadle from moving upwardly to a position substantially in advance of the braking system. This insures that the treadle will move up gradually as rapidly as the braking system is applied.

The device described is very compact and easy to install. Its shape and proportions can be varied to fit any space available, which is not the case with the diaphragm or round power cylinder now in use. The treadle 8 may be moved upwardly throughout the entire range by any suitable spring (not shown). Actually, however, I find it advantageous to use a spring only to move the treadle up to the position shown in solid outline in Figs. 1 and 2 and very slightly beyond, i. e., into the braking range. For the further lifting of the treadle once the braking action has been initiated, I utilize the housing 63 (Figs. 2 and 11) forming a journal for the shaft 64 by which the treadle is pivotally carried. The shaft 64 carries vane piston 65 which fits snugly into the arcuate section 66 of the housing 63. This arcuate section, together with the vane piston 65 define chamber 67 of variable volume connected to outlet 68. Outlet 68 (Fig. 2) is connected by a suitable tube (not shown) to the port 69 (Figs. 2 and 5) communicating with chamber 33. In this embodiment, tube 103 operates only as an air inlet, i. e., to maintain atmospheric pressure on that face of vane piston 65 presented to chamber 105 of variable volume. In this way whenever chamber 33 is under vacuum, the vacuum is communicated to chamber 67 thereby resulting in a differential pressure on vane piston 65 tending to lift treadle 8. The intensity of this differential pressure and the resulting tendency to lift the treadle is exactly proportional to the vacuum obtaining in chamber 33 and therefore furnishes the operator with an exact index of the extent to which the braking system has been applied.

In Fig. 3 and Figs. 8–10 I have shown an alternative form of device by which the vacuum may be controllably utilized to control the braking action. This includes the housing 71. This defines the bearings 72 and 73 (Fig. 9). Sleeve 74 (Fig. 8) is journaled in these bearings. Sleeve 74 defines slots 75, 76, and 77 which extend up to but not into the area overlain by the bearings. Sleeve 74 is connected to the ring 12 (Fig. 3) and thereby operatively connected to levers 11 and 14 in the same manner as sleeve 25 hereinbefore described. Journaled in the sleeve is the channeled stud 81 (Fig. 8) defining the channels 82 and 83 and the intermediate solid portion 84. For maximum sensitivity the width of the solid portion 84 is exactly equal to the width of slot 76. These channels extend up to but not into the area overlain by the bearings 72 and 73. Housing 71 defines a chamber 85 provided with the window 86 overlain by air strainer 87. The housing also defines the chamber 88 of arcuate cross-section while sleeve 74 carries the projecting vane piston 91 snugly fitting this arcuate section and in combination therewith defining the chambers 92 and 93 of variable volume. Chamber 93 is provided with outlet 94 connected to tube 22 communicating with the intake manifold. When the treadle is depressed below the position shown in solid outline in Figs. 1 and 2, the stud 81 moves in the direction indicated by arrow 95 whereupon the solid portion 84 uncovers slot 76. In this position vacuum from tube 22 is directly communicated to chamber 93 and this in turn through slot 77, channel 83 and slot 76 is communicated to chamber 92. There is, therefore, no differential pressure on vane piston 91. When the treadle is in neutral position, i. e., in the position shown in solid outline in Fig. 2, the stud and sleeve are in the relative positions shown in Fig. 8 in which although communication between chambers 93 and 92 is blocked, this balance is not disturbed. If, however, the treadle 8 moves above the position shown in solid outline, i. e., into the braking range, the stud 81 moves in the direction indicated by arrow 97, whereupon slot 76 is uncovered and chamber 92 is placed in equilibrium with the atmosphere through slot 76, channel 82, and slot 75. The pressure differential thereby created on vane piston 91 moves it and sleeve 74 by which it is carried in the direction indicated by arrow 97, thereby applying the braking system. If, however, the treadle is held at an intermediate point the progressive movement of the sleeve 74 will bring slot 76 into registry with solid portion 84 (Fig. 8) thereby blocking the further ingress of air to chamber 92 and arresting the application of the brakes. It is possible in this way to control precisely the extent of the braking action by holding the treadle at any particular point. Stud 81 (Fig. 3) is provided with a small channel 101 while sleeve 74 carries a small inward projection 102 cooperating therewith. Channel and projection are so shaped that they do not interfere with the downward movement of the treadle but prevent the treadle from moving upwardly to a position substantially in advance of the braking system thereby insuring that the treadle will move up gradually as rapidly as the braking system is applied.

While I have shown a foot pedal this is not ordinarily required as the brake system is applied by the operation of either one of the devices hereinbefore described in response to the treadle action. The foot pedal may, however, be of service in the event of a failure of the device or of the vacuum producing means or in case additional braking effect is required. As the brake is applied by the operation of the device the foot pedal will, of course, move down but if desired a clutch may be installed between pedal and the sleeve so that the foot pedal remains in position although the braking system is applied, but if depressed operatively engages the sleeve. In the system last hereinabove described the spring by which the treadle is moved upwardly may, if desired, be adapted to move the treadle throughout the accelerating and braking ranges or, alternatively, I may employ a device such as that shown in Fig. 11 for moving the treadle upwardly in the braking range. In this case, however, the connections are different and tube 68 is permanently connected to the intake manifold or alternative means for producing vacuum. Tube 103 is, however, connected by a suitable connection to tube 104 (Fig. 8) so that whenever air is admitted to chamber 92 it is simultaneously admitted to chamber 105 (Fig. 11) thereby setting up a differential pressure urging vane piston 65 in the direction indicated by arrow 106 and tending to lift treadle 8 in the braking range. Here again the magnitude of the lifting force is directly proportional to the extent to which the braking system has been applied and the operator has a means of determining the exact extent to which the brakes have been applied.

While we use the word "treadle" in the specification and claims, it will be understood that we mean to include the foot pedal and similar means that operate by movement in a vertical plane to control the acceleration of the vehicle.

The foregoing description is furnished by way of illustration and not of limitation, and it is, therefore, my intention that the invention be limited only by the appended claims or their equivalents wherein I have attempted to claim broadly all inherent novelty.

I claim:

1. In an automotive vehicle including means for producing vacuum and including a braking system, a treadle controlling the acceleration of said vehicle in its movement downwardly from idling position and adapted for movement upwardly from idling position, a sleeve defining openings operatively connected to said braking system, a vane piston carried by said sleeve, a housing of arcuate cross-section cooperating with said vane piston defining with one face of said piston a first chamber of variable volume and with the other face of said piston a second chamber of variable volume, said housing also defining a port cooperating with at least one of said openings in said sleeve, a channeled stud journaled in said sleeve operatively connected to said treadle, said stud, sleeve and housing constituting a valve connected to said means for producing vacuum and adapted when said treadle is upwardly with respect to idling position to produce in said chambers a differential pressure applying torque to said sleeve and thereby applying said braking system.

2. Brake applying means according to claim 1 comprising in addition means for applying to said treadle when said treadle is upwardly with respect to idling position a force proportional to said differential pressure.

3. Brake applying means according to claim 1 including in addition means for applying to said treadle when said treadle is upwardly with respect to idling position a force proportional to said differential pressure, said means comprising a shaft operatively connected to said treadle, a vane piston carried by said shaft, a housing of arcuate cross-section cooperating with said last mentioned vane piston defining with one face of said piston a first chamber of variable volume and with the other face of said piston a second chamber of variable volume and means communicating to said last mentioned chambers the pressure differential existing in said brake applying means.

4. In an automotive vehicle including means for producing vacuum and including a braking system, a treadle controlling the acceleration of said vehicle in its movement downwardly from idling position and adapted for movement upwardly from idling position, a sleeve defining openings operatively connected to said braking system, a vane piston carried by said sleeve, a housing of arcuate cross-section cooperating with said vane piston defining with one face of said piston a first chamber of variable volume and with the other face of said piston a second chamber of variable volume, said housing also defining a port cooperating with at least one of said openings in said sleeve, a channeled stud journaled in said sleeve operatively connected to said treadle, said stud, sleeve and housing constituting a valve connected to said means for producing vacuum and adapted when said treadle is downwardly with respect to idling position to place both said chambers in communication with said means for producing vacuum and when said treadle is upwardly with respect to idling position to place one of said chambers in communication with the atmosphere to produce in said chambers a differential pressure applying torque to said sleeve and thereby applying said braking system.

5. Brake applying means according to claim 4 comprising in addition means for applying to said treadle when said treadle is upwardly with respect to idling position a force proportional to said differential pressure.

6. Brake applying means according to claim 4 including in addition means for applying to said treadle when said treadle is upwardly with respect to idling position a force proportional to said differential pressure, said means comprising a shaft operatively connected to said treadle, a vane piston carried by said shaft, a housing of arcuate cross-section cooperating with said last mentioned vane piston defining with one face of said piston a first chamber of variable volume and with the other face of said piston a second chamber of variable volume and means communicating to said last mentioned chambers the pressure differential existing in said brake applying means.

7. In an automotive vehicle including means for producing vacuum and including a braking system, a treadle controlling the acceleration of said vehicle in its movement downwardly from idling position and adapted for movement upwardly from idling position, a sleeve defining openings operatively connected to said braking system, a vane piston carried by said sleeve, a housing of arcuate cross-section cooperating with said vane piston defining with one face of said piston a first chamber of variable volume and with the other face of said piston a second chamber of variable volume, said housing also defining a port cooperating with at least one of said openings in said sleeve, a channeled stud journaled in said sleeve operatively connected to said treadle, said stud, sleeve and housing constituting a valve connected to said means for producing vacuum and adapted when said treadle is downwardly with respect to idling position to place both said chambers in communication with atmospheric pressure and when said treadle is upwardly with respect to idling position to place one of said chambers in communication with said means for producing vacuum to produce in said chambers a differential pressure applying torque to said sleeve and thereby applying said braking system.

8. Brake applying means according to claim 7 comprising in addition means for applying to said treadle when said treadle is upwardly with respect to idling position a force proportional to said differential pressure.

9. Brake applying means according to claim 7 including in addition means for applying to said treadle when said treadle is upwardly with respect to idling position a force proportional to said differential pressure, said means comprising a shaft operatively connected to said treadle, a vane piston carried by said shaft, a housing of arcuate cross-section cooperating with said last mentioned vane piston defining with one face of said piston a first chamber of variable volume and with the other face of said piston a second chamber of variable volume and means communicating to said last mentioned chambers the pressure differential existing in said brake applying means.

MATHIAS LEUPOLD.